United States Patent [19]

Klacik et al.

[11] 4,452,825

[45] Jun. 5, 1984

[54] SORBITOL-CONTAINING HARD CANDY

[75] Inventors: Kenneth J. Klacik, Spring Valley; Walter V. Vink, Purdys, both of N.Y.; Paul R. Fronczkowski, Oakland, N.J.

[73] Assignee: Nabisco Brands, Inc., Parsippany, N.J.

[21] Appl. No.: 413,655

[22] Filed: Sep. 1, 1982

[51] Int. Cl.$^3$ ............................................. A23G 3/00
[52] U.S. Cl. .................................. 426/658; 426/660; 426/804
[58] Field of Search ................ 426/548, 660, 804, 658

[56] References Cited

U.S. PATENT DOCUMENTS

| | | | |
|---|---|---|---|
| 3,114,642 | 12/1963 | Meisel | 426/660 |
| 3,438,787 | 4/1969 | Du Ross | 426/548 |
| 3,738,845 | 6/1973 | Liebrand | 426/548 |
| 4,225,627 | 9/1980 | Moore | 426/660 |
| 4,241,092 | 12/1980 | Halik | 426/660 |
| 4,311,722 | 1/1982 | Vink | 426/804 |
| 4,335,147 | 6/1982 | Sollich | 426/660 |

Primary Examiner—Jeanette M. Hunter
Attorney, Agent, or Firm—R. Kornutik

[57] ABSTRACT

A clear amorphous sugar-free hard candy prepared on a continuous basis from an aqueous sorbitol solution by heating such solution to a moisture-content level of less than about 5% by weight and then cooling the resulting mass to a temperature of from about 160° F. to about 200° F. before providing crystal nucleation sites sufficient to obtain a hard candy set time of no more than about 30 minutes in a metal mold.

19 Claims, 4 Drawing Figures

SORBITOL-CONTAINING HARD CANDY

BACKGROUND OF THE INVENTION

The present invention relates to a novel sugarless confection, and, in particular, to an amorphous, clear sugar-free hard candy and the method of making such candy.

Over the years, there has been a demand on the confectionary industry for various reasons to produce a sugarless hard candy confection resembling ordinary hard candy in appearance and organoleptic qualities such as smoothness, non-tackiness, etc. Attempts have been made for example, to replace sucrose, corn syrup, flavoring, and coloring with combinations of sorbitol, mannitol, and other materials including coloring and flavor.

While sorbitol is particularly suitable as a candy ingredient because of its close resemblance to sugar in sweetness and nutritive values, hard candy confections which include sorbitol are extremely difficult to prepare because of the inherent tendency of the candy pieces to remain soft or tacky instead of solidifying into hard candy as desired. At one time hard candy made from sorbitol solution, crystalline sorbitol and crystalline mannitol usually included a gum, such as larch gum, acacia or tragacanth, in order to promote the "setting-up" or solidification of the confection. Since the inclusion of gum necessitates relatively low cooking temperatures and a relatively high moisture content in the solution from which the confection is prepared in order to keep the gum suspended, the crystallization time for the confection is extremely long, frequently requiring as much as several days in processing time. Moreover, when sorbitol-containing hard candy confections prepared with gum crystallize, clarity is destroyed owing to the presence of the colloidally dispersed gum and to the surface crystallization of the sorbitol and mannitol.

Attempts to overcome some of the problems associated with the making of sorbitol-containing hard candy include processes such as that described in U.S. Pat. No. 3,438,787 to DuRoss in which an aqueous solution containing sorbitol and not more than about one-fourth part by weight of mannitol per unit weight of sorbitol is heated to reduce the moisture to not more than 0.5% by weight of the solution before cooking to a temperature within the range of from 160° F. to 200° F. and seeding with no less than 0.5% by weight finely ground crystalline sorbitol, mannitol and/or carbohydrates to form a sugar-free hard candy upon solidification in a controlled environment.

Another process is described in U.S. Pat. No. 3,371,626 to Hachtman wherein an aqueous solution of sorbitol is heated to a temperature above melting point of sorbitol and sufficiently high to evaporate the water and then depositing the solution into thin-walled cavities of plastic mold while maintaining the temperature above the setting temperature but below the temperature at which the plastic mold cavity walls will heat-deform. This process was intended primarily to eliminate the need for starch molding which is a messy, dusty operation resulting in a cloudy starch-coated product.

Even though both of the processes described above reduce the time usually required for a confectionary aqueous sorbitol solution to set or solidify sufficiently to further process hard candy units, such improved set times are still far in excess of a solidifying time which is appropriate for a high volume production of sorbitol-containing hard candy units. The DuRoss process takes at least an hour to yield a hard candy product while the Hachtman method requires eight hours.

Another method described in U.K. No. 1,403,696 to ICI includes melting sorbitol and mannitol crystals using only an amount of water sufficient to effect solution of the crystals. According to this disclosure a set time of 15 minutes may be attained if the temperature of the melt is 140° F. when placed in the molds. However, at a temperature of only 140° F, the viscosity of the melt would predictably be so high as to preclude processing on a continuous basis.

Other disclosures such as U.S. Pat. No. 3,738,845 to Liebrand and U.S. Pat. No. 4,241,092 to Halik, et al. show variations in cooking and processing in order to achieve different product results.

However, in view of the continued demand for a sugar-free hard candy, it is an object of the present invention to provide a sorbitol-sweetened hard candy confection having a glass-like appearance and excellent mouth feel which can be manufactured in high volume by a continuous process.

BRIEF DESCRIPTION OF THE INVENTION

The present invention is a clear sugar-free hard candy and a method for making such candy from an aqueous sorbitol solution containing less than about 3% by weight of mannitol by heating the solution until the resulting mass contains less than about 5.0% but more than about 0.5% moisture, and then cooling it to a temperature of from about 160° to about 200° F. before providing crystal nucleation sites sufficient to obtain a hard candy set time of no more than about 30 minutes in a metal mold. Such nucleation sites may be provided by applying an intranucleating initiator promoter (homogeneous nucleation) or by external seeding with a crystalline material selected from the group consisting of mannitol, sorbitol, and other carbohydrates in an amount not more than about 0.4% based on the weight of the mass (hetergeneous nucleation). The mass is then deposited in metal molds preferably having a meniscus forming means so that a gently curved top surface is provided upon solidification. Optionally, after heating the sorbitol solution to reduce the moisture prior to cooling, the sorbitol mass can be brought to a temperature of from about 240° F. to about 310° F. at which point a coloring agent and acid flavors are added in an amount of from about 0.6% to about 2.0% of acid flavorant and from about 0.02% to about 1.5% of coloring agent based on weight.

As a result of this invention a sugar-free clear hard candy can be produced on a commercial basis by continuously depositing the prepared sorbitol mass and demolding for further handling allowing for no more than about 30 minutes solidification or "set" time. Consequently, the number of molds needed as well as a space for racking-deracking system, setting space for filled molds, and the accompanying labor costs, are reduced.

Moreover, when the metal depositing molds are provided with demolding push pins as is preferred, and the relative humidity of the air is roughly equivalent to the equilibrium relative humidity (ERH) of the deposited candy, the hard candy unit produced can be automatically released quickly and easily by merely depressing the push pins.

DETAILED DESCRIPTION OF THE INVENTION

Figure 1:
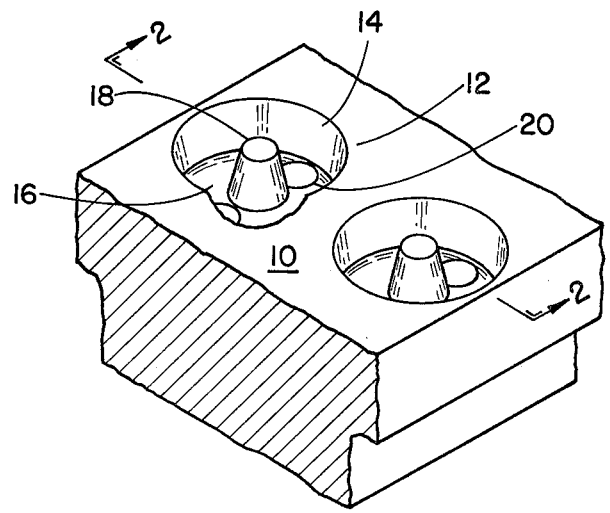
FIG. 1 is a top plan view of the preferred mold used in the present invention.
Figure 2:
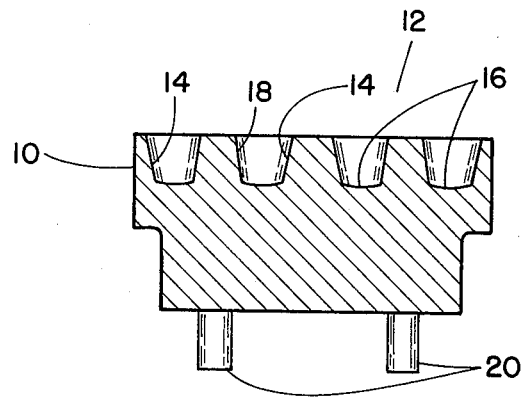
FIG. 2 is a section of the mold shown in FIG. 1 along line II—II.
Figures 3, 4:
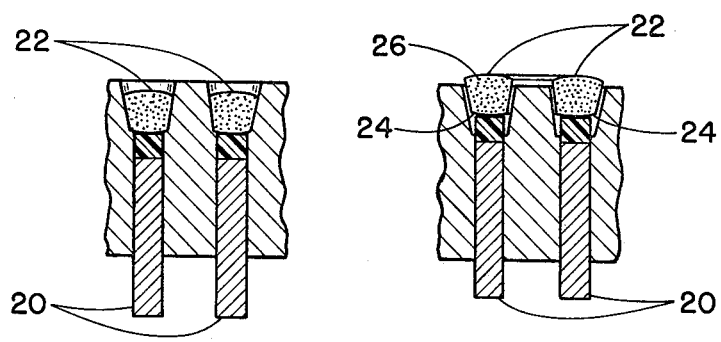
FIG. 3 is a section view similar to that of FIg.2, but taken at an angle of 90° to FIG. 2 which shows the cavity filled.
FIG. 4 shows the cavity of FIG. 3 during ejection of the set candy unit.

The clear amorphous sugar-free hard candy of the present invention is prepared from an aqueous solution of sorbitol having a mannitol content of less than about 3%, and preferably less than about 1% by weight based on the weight of the starting solution. This aqueous sorbitol solution is then heated to drive off the water, e.g., in a reduced-pressure atmosphere such as a partial vacuum, until the moisture content of the resulting sorbitol mass is less than about 5%, and preferably less than about 3%, but, in any event, the remaining moisture level is greater than at least about 0.5%, and, preferably, greater than about 1.0%.

After heating to reduce the moisture content, the resulting mass or syrup can be brought to a temperature of from 240° F. to about 310° F. at which point a coloring agent can be added which is generally a concentrated aqueous dye and an acid flavoring agent such as malic acid, lactic acid, tartaric acid, and citric acid in order to effect uniform and thorough incorporation into the sorbitol mass. The coloring agent is added in an amount of from about 0.02% to about 1.5% based on weight, and preferably from about 0.04% to about 1.0%, while the acid flavoring is included in an amount from about 0.6% to about 2.0% and preferably from 0.7% to about 1.0% based on weight.

Upon addition of the dye and acid flavorants at elevated temperatures, the mass is cooled to a temperature of from about 160° F. to about 200° F. at which point the sorbitol mass is provided with crystal nucleation sites sufficient to obtain a set time of no more than about 30 minutes in a metal mold. Heterogeneous nucleation is achieved by incorporating finely ground crystalline material, e.g., sorbitol, mannitol or other appropriate seeding material. The seeding material should be mixed in the mass as thoroughly as possible in the absence of excess mechanical shear which tends to induce crystallization of the mass in the holding tank or hopper.

Homogeneous or intranucleation may be provided by applying a nucleation initiator-promoter to the sorbitol mass without addition of external material. Such initiator-promoters include but are not limited to high speed stirring or mixing, microwaves, supersonic energy, etc.

The nucleated sorbitol mass is maintained at an elevated temperature in a depositing hopper wherein the depositing head and nozzle, which are selected based on minimun production of excess mechanical shear, are also heated to a temperature sufficient to keep the mass in a molten condition.

The melt is then deposited into a metal mold for forming individual units of sugar-free hard candy. While the cavities of the metal mold can be of any particular design, it has been found that an annular shape produces a candy unit which is particularly pleasing in appearance and mouth feel. The metal mold should be heated to a temperature of between about 70° F. and 120° F. and, particularly, between about 75° F. to about 90° F. before the melt is deposited into the cavities in order to prevent super cooling.

It has been found that a mold 10 made of aluminum and coated with polytetrafluoroethylene, PTFE, is particularly well suited for effecting rapid solidification or setting of the sorbitol mass sufficiently for further processing and handling. While the present invention is not to be limited by suggested theories set forth herein, it is believed that the metal and PTFE-coated mold act as a heat sink. The heat in the deposited material is allowed to escape by convection from the exposed top surface to the ambient atmosphere and, more importantly, heat is conducted by the metal away from the deposited material. This directly opposite to the long-term setting time required with starch-mogul and plastic molds which are insulative in nature relative to the deposited material in the cavities.

Preferably, the metal mold has cavities which are generally annular in shape with a smooth gently-curved bottom 16 and continuous generally vertical walls 14. With this cavity shape a hard candy unit having a generally smooth gently rounded lower surface 24 is provided.

In order to achieve a smooth gently-curved top surface which does not have sharp edges it is desirable that a means for forming a top surface meniscus be included within the individual cavities 12. An example of such a meniscus-forming feature is a post 18 extending upwardly from the bottom of the cavity at a point situated generally concentrically in the cavity 12. The combination of the top meniscus and the molded bottom results in a smooth overall organoleptically pleasing mouth feel.

As a result of the present process for forming the molten sorbitol material the viscosity of the melt is such that when deposited directly into the center of the mold cavity the surface tension of the material between the side wall and center post forms an upwardly-curved meniscus 22 having no sharp edges. Unlike a plastic mold it is believed that the PTFE-coated metal mold has a reduced attraction for the melt thus allowing the desired meniscus to form. Moreover, this preferred mold cavity shape affords increased surface area for cooling by conduction.

In operation, when an external seeding material is used, an amount of no more than about 0.4% is needed to obtain the desired 30 minute set time, and in all presently known cases a set time of about 15 to 20 minutes has been achieved when air at 70°–90° F. and about 35% relative humidity is blown across the molds. Consequently, the metal molds can conveniently be arranged on a continuous belt which allows for a 15–20 minute travel time of the deposited sorbitol material before demolding. Ideally, the individual cavities are provided with push-pins 20 which can be automatically depressed to eject the "set" deposited sugar-free hard candy units 26 at the end of the 15–20 minute solidifying travel time before being returned by the continuous belt to the depositing point of the sorbitol-containing melt. This process reduces the number of molds needed, eliminates the need for extensive setting space and manual demolding efforts thus reducing time, space, an labor requirements.

The continuity of this operation is enhanced by the ability to deposit the sorbitol mass at a temperature of from about 160° F. to about 200° F., preferably from about 185° F. to about 195° F., and most preferably at about 190° F., at which point the viscosity is very low thus allowing rapid and efficient depositing of the sorbitol material. This is in contrast to the U.K. No. 1,403,696 patent which discloses a set time of more than 12 hours when the temperature of the deposited melt is 180° F.

EXAMPLES

Sorbitol-sweetened deposited hard candy according to the present invention was prepared by cooking about 715 grams of an aqueous sorbitol solution containing not more than about 1.0% mannitol to a temperature of about 325 F., until the moisture level of the mass was about 2.6% and then cooling to a temperature of about 285° F. before mixing about 4.5 grams of malic acid and about 6.4 grams of an aqueous red dye solution. The resulting mixture was further cooled to approximately 210° F. at which point about 1.5 grams of cherry flavor was added, which lowered the temperature to just below 200° F. Approximately 3.0 grams of finely ground crystalline sorbitol (mesh between 60 to 325) was introduced and thoroughly dispersed throughout the sorbitol melt. The resulting mixture was then deposited in an aluminum metal mold as described above which had been heated to a temperature of from about 80° F. to about 85° F. and allowed to set in an environment having a relative humidity level of from about 35 to 50% at 85° F.

After only 15 minutes the deposited sorbitol-containing mass had hardened in the individual cavities sufficiently to allow removal and handling. This set time is surprisingly low in view of the set times disclosed in the prior art of generally no less than about one hour.

Sorbitol-containing hard candies were prepared in accordance with above procedure utilizing different fruit flavors including lemon, pineapple, orange and lime, and using 1.5 grams of finely ground crystalline sorbitol. The resulting candies required only 18 minutes to set sufficiently to demold and handle.

Another sorbitol-sweetened hard candy was produced with a butter rum flavor by cooling the cooked reduced-moisture sorbitol mass to a temperature of about 285° F. and adding about 8 to 15 cc of a concentrated salt solution. The melt was then cooled to a temperature of between about 200° F. and 210° F. before adding about 1 cc of flavor which reduced the temperature to below 200° F. Approximately 1.5 grams of external seeding material was dispersed in the melt which was then deposited as in the previous examples.

The resulting hard candies set sufficiently for demolding and handling in about 20 minutes.

The above examples describe the procedure used to prepare several different desirable flavors, but it is not intended to limit the present invention by such flavors.

Thus while there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

We claim:

1. A method of preparing a clear amorphous sugar-free hard candy from an aqueous sorbitol solution comprising:

heating an aqueous sorbitol solution containing less than about 3% by weight of mannitol until the resulting mass contains less than about 3.0% but more than about 1.0% moisture;

cooling said mass to a temperature range of from about 160° F. to about 200° F;

providing crystal nucleation sites by a method selected from the group consisting of adding one of crystalline sorbitol, mannitol, or other equivalent sugar alcohol seeding material and mixtures ... thereof and applying a nucleating initiator-promoter selected from the group consisting of high speed stirring, microwave, and supersonic energy sufficient to obtain a hard candy set time of no more than about 30 minutes, and, optionally adding any flavorant;

depositing measured amounts of said mass while at said temperaturerange into a metal mold preheated to a temperature range of from about 70° F. to about 120° F; and allowing said sorbitol mass to set in air having relative humidity roughly equivalent to the equilibrium relative humidity of the deposited candy whereby said candy mass sets to a hardness sufficient to effect removal of hard candy units from said mold and to further handle in commercial processes.

2. The method of claim 1 wherein said nucleating sites are provided by adding one of crystalline sorbitol, mannitol, or other equivalent sugar alcohol seeding material and mixtures thereof in an amount of not more than about 0.4% by weight based on the total weight of said mass.

3. The method of claim 1, wherein said depositing is a continuous process which requires not more than about 30 minutes for said sorbitol mass to set sufficiently for demolding and further handling.

4. The method of claim 3 wherein said sorbitol mass sets in not more than about 20 minutes.

5. The method of claim 1 which further comprises bringing said sorbitol mass to a temperature of from about 240° F. to about 310° F. after said heating step, and before said cooling step, and adding a coloring agent in an amount of from about 0.02% to about 1.5% and an acid flavorant in an amount of from about 0.6% to about 2.0% based on the total weight of said mass.

6. The method of claim 5 wherein the amount of said coloring agent is from about 0.04% to about 1.0% and the amount of acid flavorant is from about 0.7% to about 1.0%.

7. The method of claim 5 wherein said acid flavorant is selected from the group consisting of malic acid, lactic acid, tartaric acid, and citric acid.

8. The method of claim 7 wherein said acid flavorant is malic acid.

9. The method of claim 1 where said metal mold comprises a cavity having a generally smooth gently curved bottom and a meniscus-forming means whereby the top side of the hard candy unit formed is a smooth generally rounded surface.

10. The method of claim 9 wherein said meniscus forming means is an interiorly situated post extending upwardly from said bottom and located generally concentrically of the walls of said cavity.

11. The method of claim 10 wherein said cavity has a continuous generally vertical wall which generally forms a circle.

12. The method of claim 11 wherein said metal mold is aluminum.

13. The method of claim 12 wherein said metal mold is coated with polytetrafluoroethylene.

14. The method of claim 1 wherein said metal mold is heated to a temperature of from about 75° F. to about 90° F. prior to depositing said resulting sorbitol mass.

15. The method of claim 1 wherein said nucleated sorbitol mass is deposited in said metal mold at a temperature of from about 160° F. to about 200° F.

16. The method of claim 15 wherein said deposition temperature is from about 185° F. to about 195° F.

17. A clear amorphous sugar-free hard candy which is non-tacky and has a smooth mouth feel prepared in accordance with the method of claim 1 or claim 9.

18. The method of claim 1 wherein the temperature of said preheated metal mold is between about 75° F. and about 90° F.

19. The method of claim 1 wherein air is blown across said deposited mass while said candy mass is setting, said air having an equilibrium relative humidity equivalent to the equilibrium relative humidity of said deposited mass.

* * * * *